(12) United States Patent
Kumagai et al.

(10) Patent No.: US 10,917,530 B2
(45) Date of Patent: Feb. 9, 2021

(54) IMAGE PROCESSING APPARATUS AND METHOD

(71) Applicant: CANON KABUSHIKI KAISHA, Tokyo (JP)

(72) Inventors: Takekazu Kumagai, Kawasaki (JP); Tatsuo Matoba, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/745,228

(22) Filed: Jan. 16, 2020

(65) Prior Publication Data

US 2020/0236229 A1 Jul. 23, 2020

(30) Foreign Application Priority Data

Jan. 21, 2019 (JP) .................................. 2019-007942

(51) Int. Cl.
*G06F 15/00* (2006.01)
*G06F 3/12* (2006.01)
*G06K 1/00* (2006.01)
*H04N 1/00* (2006.01)
*H04L 29/08* (2006.01)

(52) U.S. Cl.
CPC ....... *H04N 1/00217* (2013.01); *G06F 3/1204* (2013.01); *G06F 3/127* (2013.01); *H04L 67/06* (2013.01)

(58) Field of Classification Search
CPC ... H04N 1/00217; H04L 67/06; G06F 3/1204; G06F 3/127
USPC .............................. 358/1.15, 1.13, 1.1, 1.14
See application file for complete search history.

(56) References Cited

U.S. PATENT DOCUMENTS

| 2013/0308158 | A1* | 11/2013 | Morita | H04N 1/00212 |
| | | | | 358/1.15 |
| 2018/0041619 | A1* | 2/2018 | Tachi | H04M 1/2757 |
| 2019/0369930 | A1* | 12/2019 | Iida | G06F 3/1288 |

FOREIGN PATENT DOCUMENTS

JP 2013179436 A 9/2013

* cited by examiner

*Primary Examiner* — Douglas Q Tran
(74) *Attorney, Agent, or Firm* — Canon U.S.A., Inc. IP Division

(57) ABSTRACT

An image processing apparatus displays My Folder in a selectable manner on a screen for selecting a saving destination of a file in a case where a protocol included in My Folder information is determined to be available for a function selected by a user, and displays My Folder in an unselectable manner on the screen for selecting the saving destination of the file in a case where the protocol included in My Folder information is determined to be unavailable for the function selected by the user.

6 Claims, 10 Drawing Sheets

FIG.6A

| ID | 123-abc-4567 |
|---|---|
| USER ID | u00001 |
| NAME | Server1 SHARED FOLDER |
| PROTOCOL | SMB |
| HOST ADDRESS | SMBHost.Server1.com |
| FOLDER NAME | Folder1 |
| AUTHENTICATION USER NAME | User1 |
| AUTHENTICATION PASSWORD | User1Pass |

FIG.6B

| APP ID | ap001 |
|---|---|
| APP NAME | SCAN AND SAVE |
| RESTRICTED PROTOCOL | FTP |

IMAGE PROCESSING APPARATUS AND METHOD

BACKGROUND OF THE INVENTION

Field of the Invention

The present disclosure relates to a technique for transmitting, to a folder in a shared server specified by a user, read image data obtained by reading a document in an image processing apparatus, and for storing the read image data in the folder in the shared server.

Description of the Related Art

In recent years, image processing apparatuses such as multifunctional apparatuses that can execute not only a copy function but also a plurality of functions such as a print function, a fax function, a network scan function, and an address book for managing transmission destination information are widely used. Typically, such a multifunctional apparatus includes an operation panel having a touch screen function and an operation unit having hard keys. A user invokes a desired function from a function list displayed on the operation panel to operate the apparatus. When a user uses the apparatus, user authentication may be requested. In this case, the user authentication is performed by using, for example, a touch panel or a card, and if the authentication is successful, the apparatus becomes available for the user.

In Japanese Patent Application Laid-Open No. 2013-179436, an image processing apparatus is provided with a "Send File to Myself" button for specifying a tile transmission destination for an authenticated user to improve operability and security obtained when such user authentication is used. When the button is selected, a file is transmitted to and stored in a "My Folder" identified based on a folder path registered in advance for the particular user. In other words, to use the "My Folder", information such as folder path information and a communication protocol to be used must be set and registered in association with user information in advance. Japanese Patent Application Laid-Open No. 2013-479436 discusses Server Message Block (SMB) and File Transfer Protocol (FTP) as communication protocols to be used for transmitting data to "My Folder" and storing the data in "My Folder" by using the "Send File to Myself" button.

In the image processing apparatus, functions (or applications) can be executed. The functions include "Scan and Send" by which scanned image data is transmitted to one or more destinations such as an e-mail address or a file sharing destination, and "Scan and Save" by which a folder in a shared server inside or outside the image processing apparatus is specified to save the scanned image data.

From the viewpoint of user convenience, it is desirable that not only when the "Send File to Myself" function is used, but also when the "Scan and Send" function and the "Scan and Save" function are used, the above-mentioned "My Folder" can be selected as a transmission destination. However, functions including "Scan and Send" and "Scan and Save" may restrict a type of communication protocol that can be used for transmitting and storing a file. In other words, a communication protocol as a setting of the "My Folder" may be restricted depending on any of the functions supported by the image processing apparatus. In such a case, when the "My Folder" is selected as the transmission destination, processing such as transmitting and storing a file may fail. As a result, enhancement of user convenience cannot be achieved.

SUMMARY OF THE INVENTION

According to an aspect of the present disclosure, an image processing apparatus includes a storage device configured to manage folder information including path information and a type of protocol in association with user information on a user of the image processing apparatus, and provides a first function and a second function for handling image data obtained by scanning. The image processing apparatus further includes at least one memory storing instructions, and at least one processor executing the instructions causing the image processing apparatus to acquire folder information associated with user information on an authenticated user and determine whether a protocol included in the acquired folder information is available when the first function is to be used. In a case where it is determined that the protocol included in the acquired folder information is available, a folder corresponding to the acquired folder information is displayed in a selectable manner on a screen for selecting a saving destination for storing the image data as a file by using the first function, in a case where it is determined that the protocol included in the acquired folder information is unavailable, the folder corresponding to the acquired folder information is displayed in an unselectable manner on the screen for selecting the saving destination by using the first function. When the second function is to be used, a folder corresponding to the folder information including the type of the protocol determined to be unavailable is available as a saving destination for storing the image data as a file by using the second function.

Further features of the present invention will become apparent from the following description of exemplary embodiments with reference to the attached drawings.

BRIEF DESCRIPTION OF THE DRAWINGS

FIGS. 6A and 6B illustrate examples of information managed by a My Folder information management unit.

DESCRIPTION OF THE EMBODIMENTS

Best modes for carrying out the present disclosure will be described with reference to the drawings.

Figure 1:
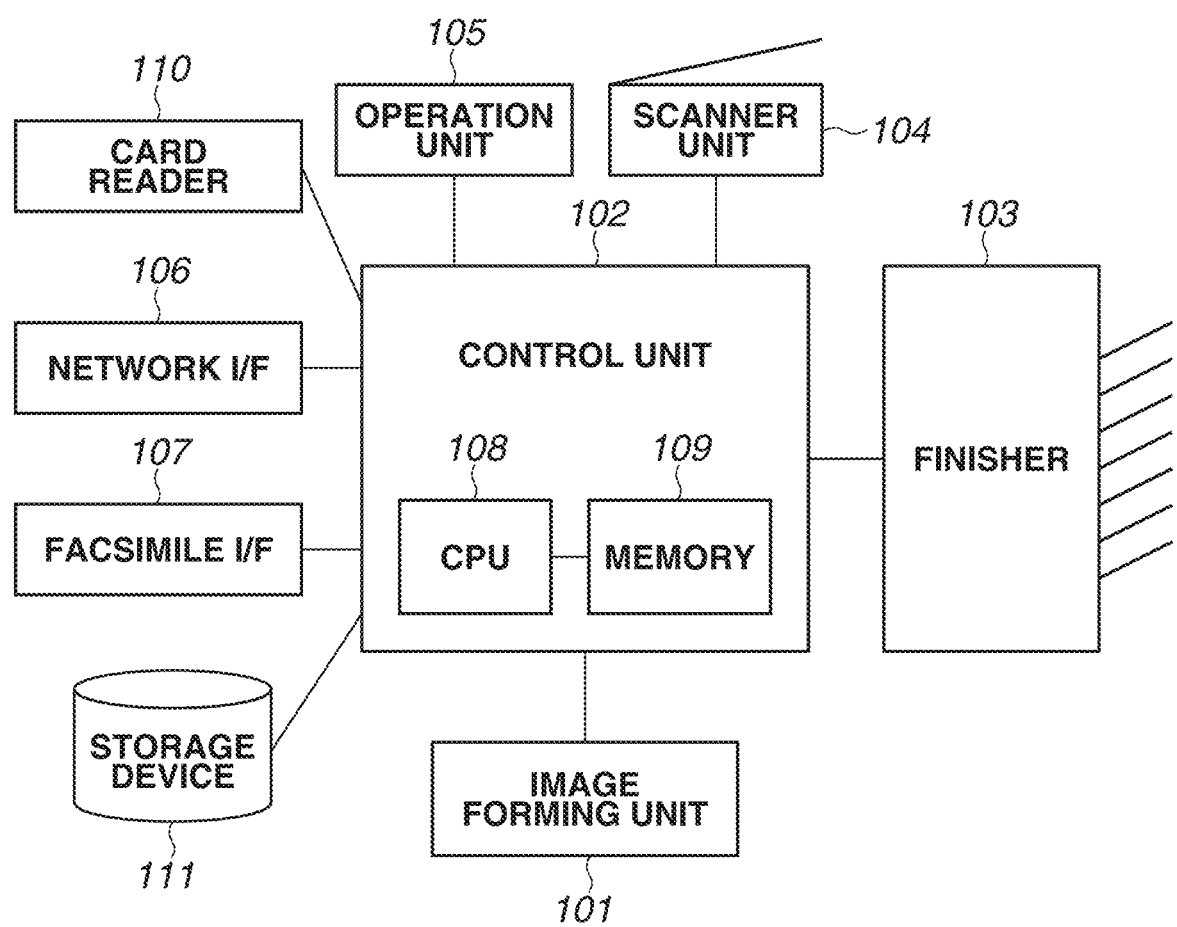
FIG. 1 is a block diagram illustrating an example of a hardware configuration of an image processing apparatus.

FIG. 1 is a block diagram illustrating a simplified configuration of an image processing apparatus according to an exemplary embodiment of the present disclosure.

The image processing apparatus includes an image forming unit 101 configured to form an image on a recording paper by a method such as an electrophotographic method, and a control unit 102 configured to perform overall control of the image processing apparatus. The image processing apparatus also includes a finisher 103 configured to perform post-processing such as stapling and a scanner unit 104 configured to read a document image to generate image data. The image processing apparatus further includes an operation unit 105 including a mechanism for inputting various data and commands and a mechanism (display unit) for accepting operations and performing various displays (display unit). The image processing apparatus further includes a network interface (I/F) 106 configured to transmit/receive data via a network, a facsimile 107 configured to transmit/receive fax data, and a card reader 110 configured to authenticate a user who wants to use the apparatus. A storage device 111 is an external storage device including, for example, a hard disk, and stores various programs to be executed in the multifunctional apparatus, setting values for controlling processing, user information, display contents, and the like. The storage device 111 further stores application programs for realizing functions such as "Scan and Send" and "Scan and Save".

The image forming unit 101, the finisher 103, the scanner unit 104, the operation unit 105, the network I/F 106, the facsimile I/F 107, the card reader 110, and the storage device 111 are each connected to the control unit 102 through a dedicated interface.

The control unit 102 includes at least a central processing unit (CPU) 108 and a memory 109. The memory 109 is used as a work memory for executing programs for performing processing corresponding to a flowchart described below and controlling display on the display unit.

Figure 2:
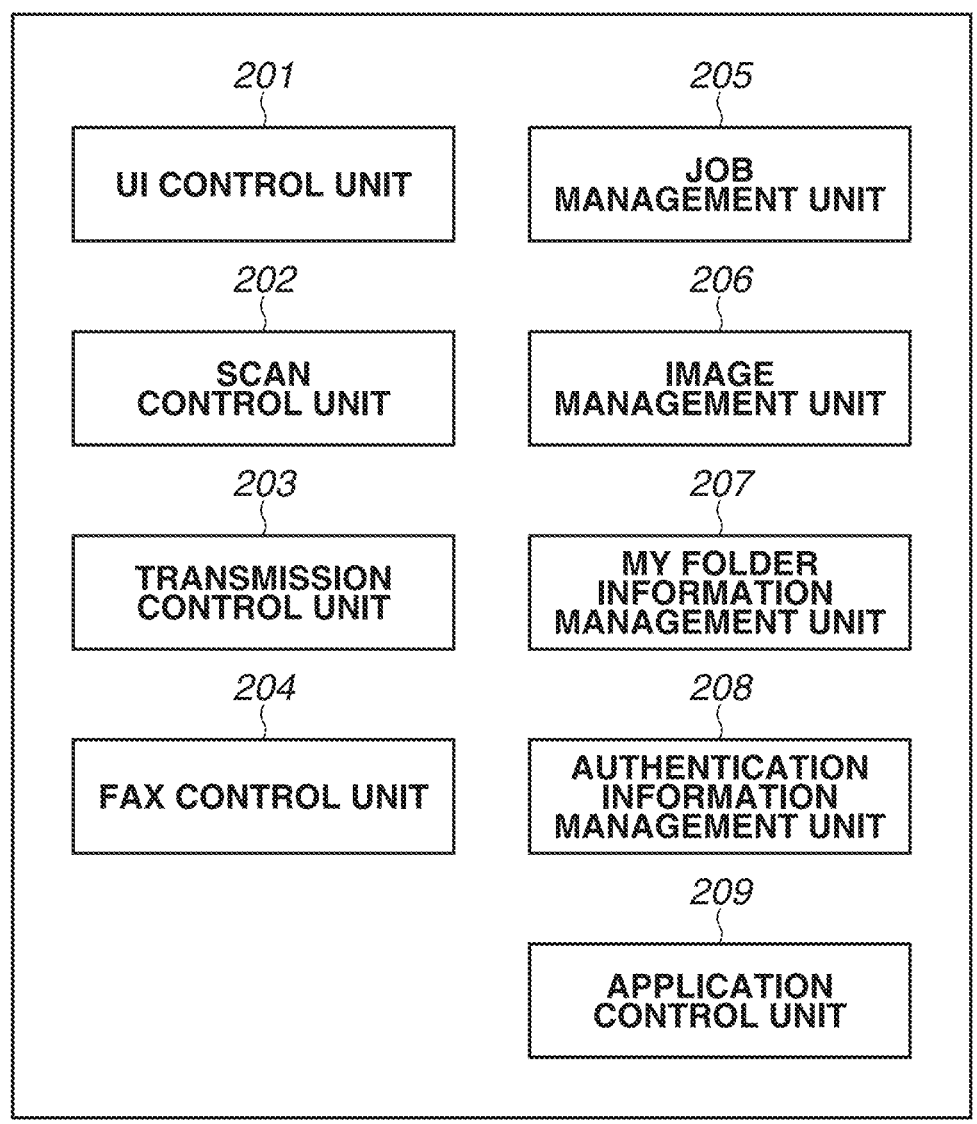
FIG. 2 is a block diagram illustrating a software module configuration in the image processing apparatus.

FIG. 2 is a block diagram illustrating a software module configuration in the image processing apparatus. The configuration represents functions to be realized when the CPU 108 executes one or more programs.

A UI control unit 201 displays an operation screen on the operation unit 105 and controls a user interface (UI) configured to accept a user operation. A scan control unit 202 controls the scanner unit 104 and controls processing for reading a document image.

The transmission control unit 203 controls processing of transmitting and storing, as a file, image data read by the scan control unit 202 to and in a destination specified by a user through, for example, the network I/F 106, in the "Scan and Send" function or the "Scan and Save" function.

In the "Scan and Send" function, a protocol for file sharing can be selected from Server Message Block (SMB), Web-based Distributed Authoring and Versioning (WebDAV), File Transfer Protocol (FTP), and the like. In the "Scan and Save" function, either SMB or WebDAV are selectable, and FTP is not selectable.

A fax control unit 204 controls transmission/reception of faxes through the facsimile I/F 107 in a "Fax" function. A job management unit 20 manages a transmission request from a user that is accepted by the UI control unit 201 and an execution state of the request. An image management unit 206 manages management information on an image read by the scanner unit 104. An authentication information management unit 208 is responsible for user authentication processing, and manages information set for each user in association with authentication.

A My Folder information management unit 207 manages information on "My Folder" of each user who uses the image processing apparatus. Specifically, the My Folder information management unit 207 manages information on My Folder in association with user information used for authentication in the storage device 111. "My Folder" is selectable as the transmission destination when the "Scan and Send" function is used. On the other hand, "My Folder" is selectable as the transmission destination under a predetermined condition when the "Scan and Save" function is used.

An application control unit 209 performs registration management of an application list registered in the image processing apparatus, and control of start and termination. Examples of the application include Copy, Scan and Send, Fax, Scan and Save, and Use Saved File, as illustrated in FIG. 4.

Figure 3:
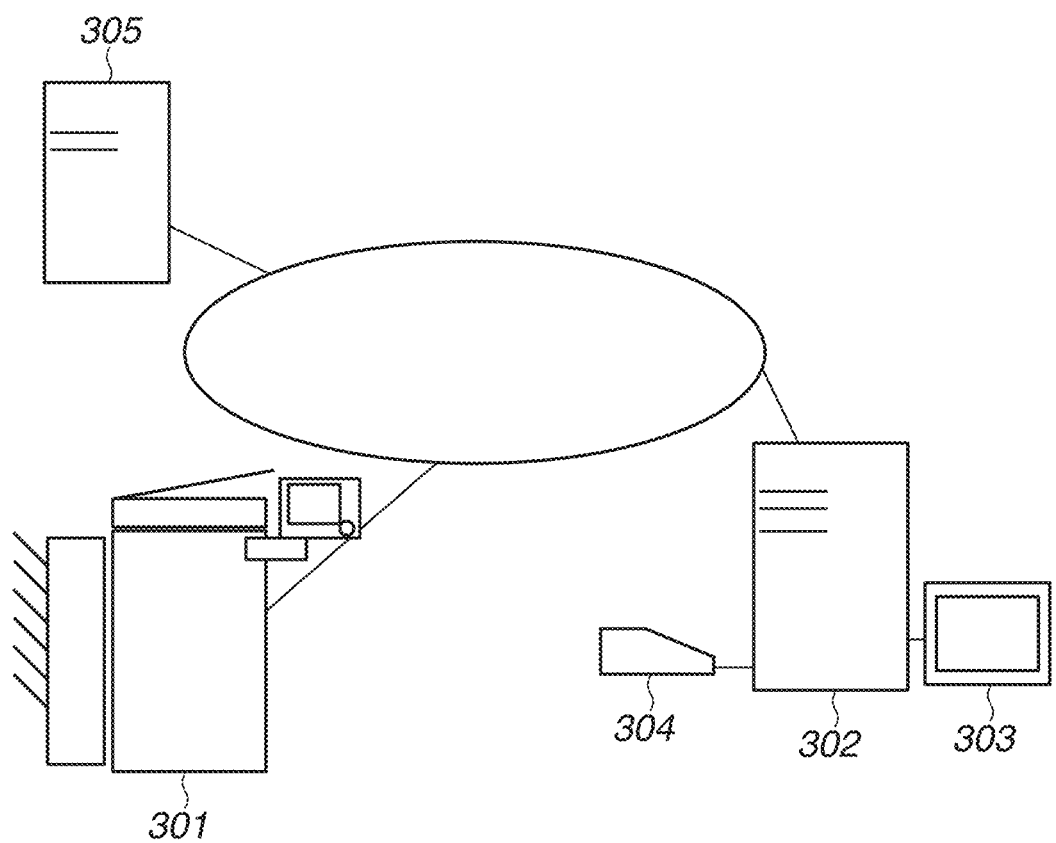
FIG. 3 is a diagram illustrating an example of a system configuration including the image processing apparatus.

FIG. 3 is a diagram illustrating an example of a system configuration including the image processing apparatus.

An image processing apparatus 301 is included in the system configuration. A file sharing server 302 is a file server that can be a transmission destination of image data obtained by scanning a document. A display unit 303 and an input device 304 are connected to the file sharing server 302. An authentication server 305 is responsible for user authentication when the image processing apparatus 301 and the server 302 are used. They are connected via a network. The image processing apparatus 301 may have a function for user authentication that the authentication server 305 has. The network may include one or more file sharing servers, or a file sharing server can be implemented in the image processing apparatus 301.

Figure 4:
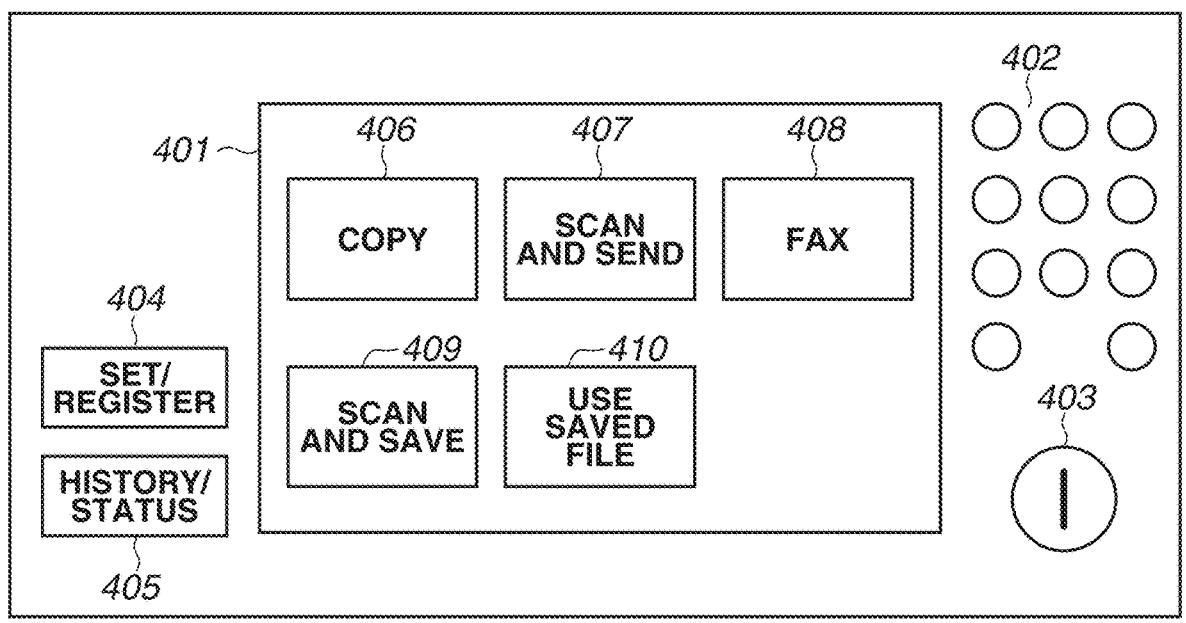
FIG. 4 illustrates an example of a home screen displayed on an operation unit.

FIG. 4 illustrates an example of a home screen displayed on the operation unit 105. A user can operate the home screen to invoke a desired function and give an execution instruction. A selection screen 401 is displayed on the home screen, and buttons for selecting a function to be invoked are arranged on the selection screen 401. In this example, buttons 406 to 410 for invoking the "Copy" function, the "Scan and Send" function, the "Fax" function, the "Scan and Save" function, and the "Use Saved File" function, respectively, are arranged. Numeric keys 402 and a start key 403 for giving an instruction for start of a job are arranged. A "Set/Register" button 404 for viewing a setting screen for the apparatus and a "History/Status" button 405 for viewing a job history|status screen are further arranged.

Figure 5A:
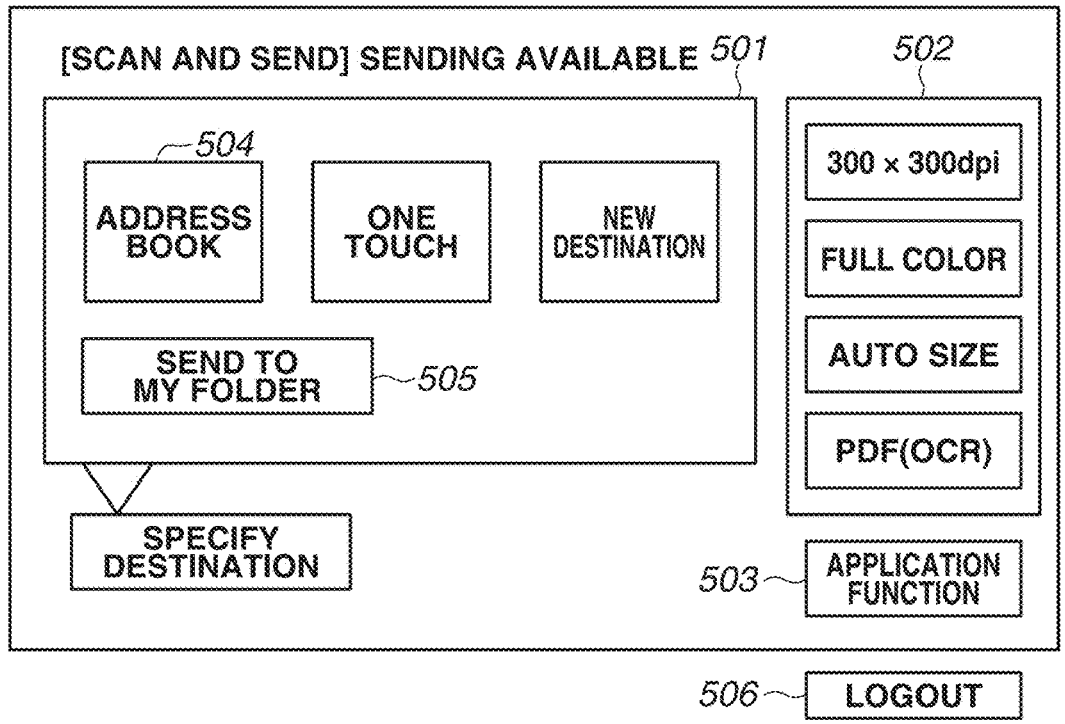
FIGS. 5A and 5B illustrate examples of operation screens of a "Scan and Send" function and a "Scan and Save" function, respectively, which are displayed on the operation unit.

FIG. 5A illustrates an example of an operation screen for scanning and transmission, which is to be displayed on the operation unit 105 when a user presses the "Scan and Send" button 407. In FIG. 5A, an area 501 in which buttons for specifying a transmission destination are arranged is displayed. The destination can be input by any method to be selected from "Address Book", "One Touch", and "New Destination". For example, when a user operates an address book invocation button 504, an address book screen is displayed, and the user can specify any of destinations included in the address book. In a case where the destination is specified, a protocol for file sharing such as SMB, FTP, and WebDAV can be specified as a transmission method. As an alternative to file sharing, a transmission method such as Simple Mail Transfer Protocol (SMTP, electronic mail) or fax transmission can also be specified.

An area 502 is an area in which buttons for various settings of image data generated by scanning, such as reading resolution and reading color mode, are arranged. An application function button 503 is a button for invoking various detailed settings for reading and transmitting a document by scanning.

A send-to-my-folder button 505 is displayed in an environment where user authentication for using the image processing apparatus is available. The send-to-my-folder button 505 is used for specifying, as a transmission destination, a specific destination ("My Folder") associated with user information on an authenticated user. When the send-to-my-folder button 505 is selected, a file is transmitted by using path information and a transmission method (protocol) of a folder registered in association with user information on a user who has been authenticated in advance and has logged in. A button 506 is a button to be displayed when user authentication has been performed, and is a button that is to be pressed when the user logs out after finishing the work.

Figure 5B:
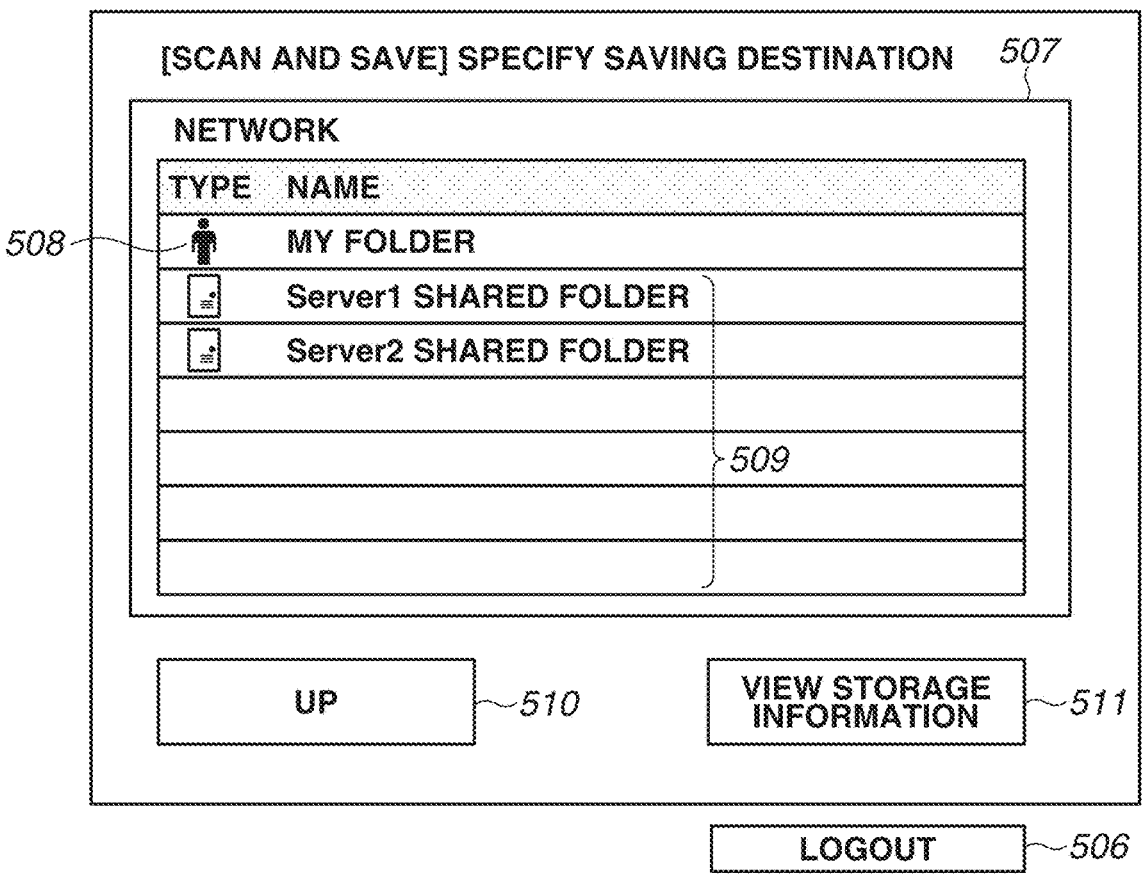

FIG. 5B illustrates an example of an operation screen to be displayed on the operation unit 105 when the user presses the "Scan and Save" button 409. In FIG. 5B, a list 507 of, for example, shared folders in the external file sharing server 302, which are registered in advance as candidate saving destinations, is displayed.

In the image processing apparatus according to the present exemplary embodiment, the list 507 including a "My Folder" 508 corresponding to a specific destination associated with the user information on the user who has been authenticated in advance and has logged in is displayed in an environment where user authentication is available My Folder 508 is controlled to be selectable under a predetermined condition. This control will be described below.

As described above, the list 507 includes information on one or more registered shared folders 509 on a file server in addition to My. Folder 508. Besides the shared folder on the network, a folder reserved in the storage device 111 and/or a folder in a memory medium connected to the USB port can be registered and displayed as a candidate saving destination. Unlike My Folder 508, the information on the shared folder 509 is registered without being associated with the user information, and is shared by a plurality of users who uses the image processing apparatus.

As described above, in the "Scan and Save" function, either SMB or WebDAV is selectable as a communication protocol for transmitting and storing a file including image data obtained by scanning, while FTP is not selectable. For this reason, a shared folder in a file sharing server that can be connected by using the SMB or WebDAV protocol is registered as the shared folder 509.

When a user selects one of My Folder 508 and the shared folders 509, a list (not illustrated) of files and folders included in the selected folder is displayed. When data is scanned while this screen is being displayed, the scanned data is stored as a file in the selected folder.

An up button 510 is a button to be pressed to shift to an upper-level folder from the currently displayed folder. A view-storage-information button 511 is a button to be pressed for displaying information on the currently selected file sharing server. When the view-storage-information button 511 is pressed, a storage information viewing screen showing information including the name, address information, connection protocol, and amount of free space of the file sharing server is displayed. The button 506 is as described with reference to FIG. 5A.

By operating the "Use Saved File" button 410 illustrated in FIG. 4, it is possible to select and print a file saved by using the "Scan and Save" function.

FIG. 6A illustrates an example of one record of My Folder information managed by the My Folder information management unit 207. Each of My Folder information records includes an ID for uniquely identifying the My Folder information and a user ID being user information for uniquely identifying a user having logged in.

The My Folder information includes a display name of the folder, a type of communication protocol used for communication with a file sharing server, an address of the file sharing server, path information on the folder, an authentication user name for connecting to the file sharing server, and an authentication password. Examples of communication protocols that can be set as My Folder information include SMB, and WebDAV. In addition, another protocol such as Common Internet File System (CIFS) may be included.

FIG. 6B illustrates an example of one record of restricted protocol information managed by the My Folder information management unit 207. For each function (application) in which the My Folder function is used, if a file sharing protocol that can be used is restricted, the restriction is registered in the restricted protocol information. The restricted protocol information includes an ID for uniquely identifying a function (application), a display name of the function (application), and a protocol type to be restricted. In this example, it is indicated that "FTP" is unavailable in the "Scan and Save" function.

Figure 7:
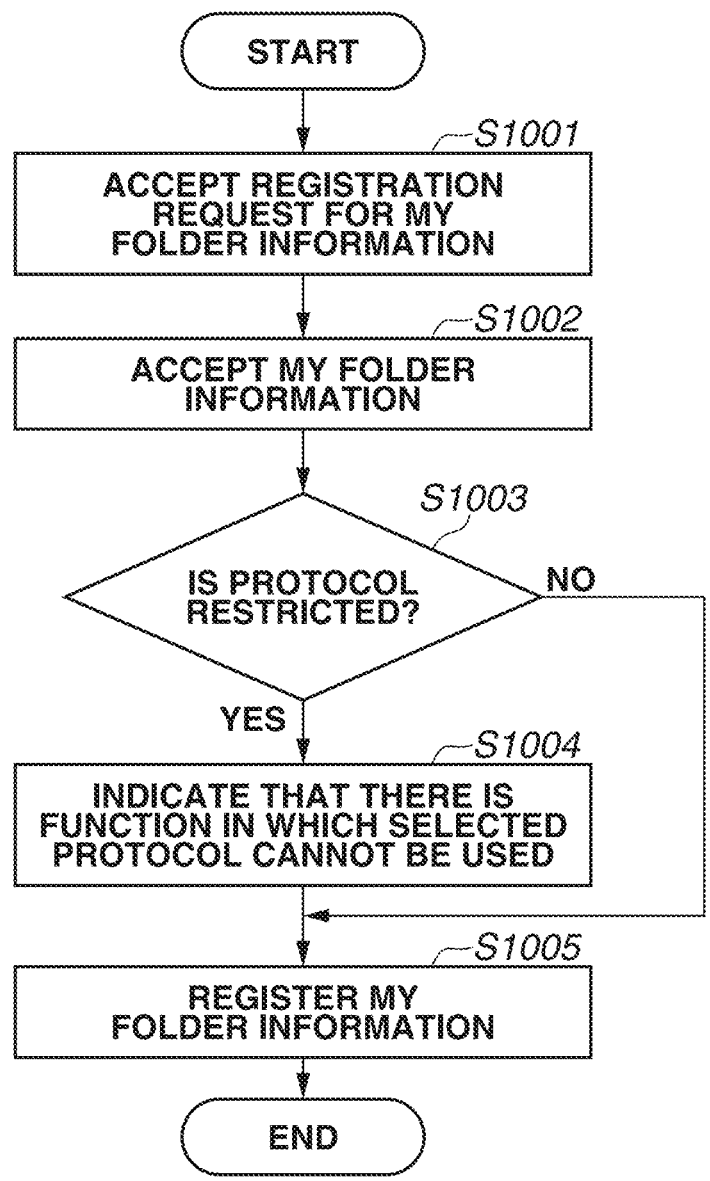
FIG. 7 is a flowchart for explaining processing for a user to register information on My Folder in the image processing apparatus.

Processing for registering information on My Folder will be described with reference to a flowchart in FIG. 7.

The processing is started when an operation for registering My Folder information is performed after a user is successfully authenticated by using the authentication information management unit 208 based on authentication information input by the user. The user holds a user authentication card over the card reader 110 or inputs a user name and a password to a user authentication screen displayed on the operation unit 105, so as to input the authentication information.

In step S1001, the UI control unit 201 accepts registration request of the My Folder information in response to selection of the "Set/Register" button 404 on the home screen and an operation for registering the My Folder information.

Figure 10:
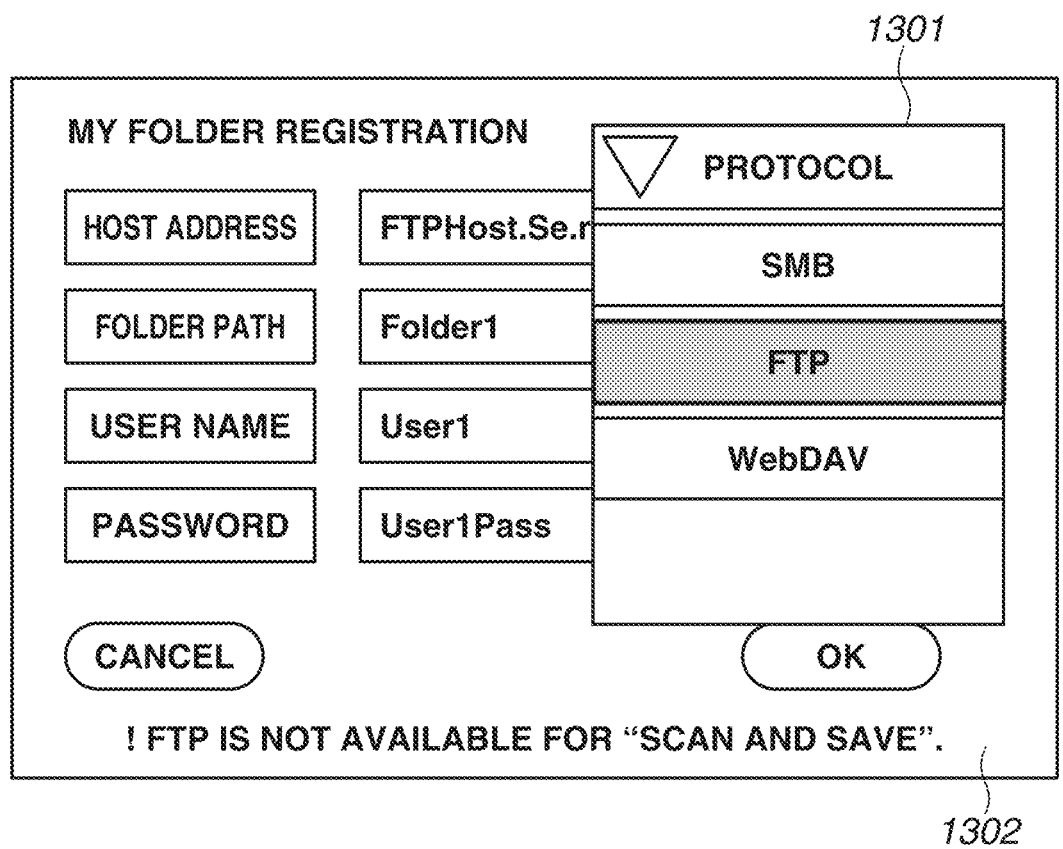
FIG. 10 illustrates an example of a My Folder registration screen.

FIG. 10 illustrates an example of a registration screen for registering the My Folder information, and the registration screen is displayed in response to a registration request of the My Folder information. On the My Folder registration screen, input fields for inputting a host address, a folder path, an authentication user name, and an authentication user password are arranged. By using a protocol selection pull-down 1301, a protocol used for file sharing and the like can be set. In the example of FIG. 10, "FTPHost.Server1.com" is input as the host address, "Folder1" is input as the folder path, "User1" is input as the authentication user name, and "User1Pass" is input as the authentication user password. "FTP" is selected as the protocol. A message display area 1302 is an area in which a message related to settings and corresponding to the input on the registration screen is displayed. As an alternative to the example, the message may be displayed by using a dialog box.

In step S1002, the UI control unit 201 accepts the My Folder information input by the user on the My Folder registration screen.

In step S1003, the UI control unit 201 refers to the restricted protocol information managed by the My Folder information management unit 207, and determines whether or not there is a function (application) in which the protocol type included in the My Folder information accepted in step S1002 is restricted. In a case where there is a function in which the protocol type included in the My Folder information is restricted (YES in step S1003), the processing proceeds to step S1004, and in a case where there is no function in which the protocol type included in the My Folder information is restricted (NO in step S1003), the processing proceeds to step S1005.

In step S1004, the UI control unit 201 displays a message for alerting that there is a function in which the selected protocol cannot be used, on the my folder registration screen illustrated in FIG. 10. For example, in FIG. 10, since FTP is selected, "FTP is unavailable for Scan and Save" is displayed in the message display area 1302. Even if this message is displayed, it is possible to register the My Folder information by selecting an OK button on the My Folder registration screen.

In step S1005, the UI control unit 201 passes the my folder information accepted in step S1002 to the My Folder information management unit 207, in response to selection of the OK button on the My Folder registration screen. The My Folder information management unit 207 saves the My Folder information in the format as illustrated in FIG. 6A in the storage device 111 in association with the user information on the user having logged in.

Processing for using the My Folder information will be described with reference to a flowchart of FIG. 8. The processing is started when the UI control unit 201 accepts a selection of a function (application) on the home screen displayed on the operation unit 105 from the user. A case where the "Scan and Save" button 409 is selected will be specifically described as an example. The UI control unit 201 instructs the application control unit 209 to start an application that executes the "Scan and Save" function, in this case, the processing in this flowchart is to be realized by the CPU 108 executing the started "Scan and Save" application. In the following description, the subject of each process is simply expressed by using a term "application".

In step S1102, the application determines whether a user who has been successfully authenticated has logged in. In a case where the user has been authenticated (YES in step S1102), the processing proceeds to step S1103, and in a case where the user has not been authenticated (NO in step S1102), the processing proceeds to step S1108.

In step S1103, the application requests the My Folder information management unit 207 to acquire the My Folder information associated with the user information on the user having logged in. In response to the acquisition request, the My Folder information management unit 207 searches for the My Folder information as illustrated in FIG. 6A, using the user ID of the user having logged in as a key.

In step S1104, the application determines whether or not the My Folder information associated with the user information on the user having logged in is successfully acquired from the My Folder information management unit 207, as a result of the acquisition request. In a case where the My Folder information is successfully acquired (YES in step S1104), the processing proceeds to step S1105, and in a case where the My Folder information is not successfully acquired (NO in step S1104), the processing proceeds to step S1107.

In step S1105, the application determines whether or not a protocol set as the My Folder information is available, by referring to FIG. 6B. In the "Scan and Save" application, for example, SMB is available, but FTP is unavailable. In a case where the application determines that the protocol is available (YES in step S1105), the processing proceeds to step S1106, and in a case where the application determines that the protocol is unavailable (NO in step S1105), the processing proceeds to step S1107.

In step S1106, the application instructs the UI control unit 201 to display "My Folder" corresponding to the My Folder information in a selectable manner. In step S1107, the application instructs the UI control unit 201 to display "My Folder" corresponding to the My Folder Information in an unselectable manner. The unselectable manner means that the My Folder button is displayed as, for example, a shaded button and the button cannot be operated. An explicit text may be displayed to indicate that the My Folder button cannot be used.

In step S1108, the application acquires information on a candidate saving destination other than "My Folder" and instructs the UI control unit 201 to display the candidate saving destination. The information on the candidate saving destination other than "My Folder" means information on a shared folder in the file sharing server 302 that has already been registered.

Figure 8:
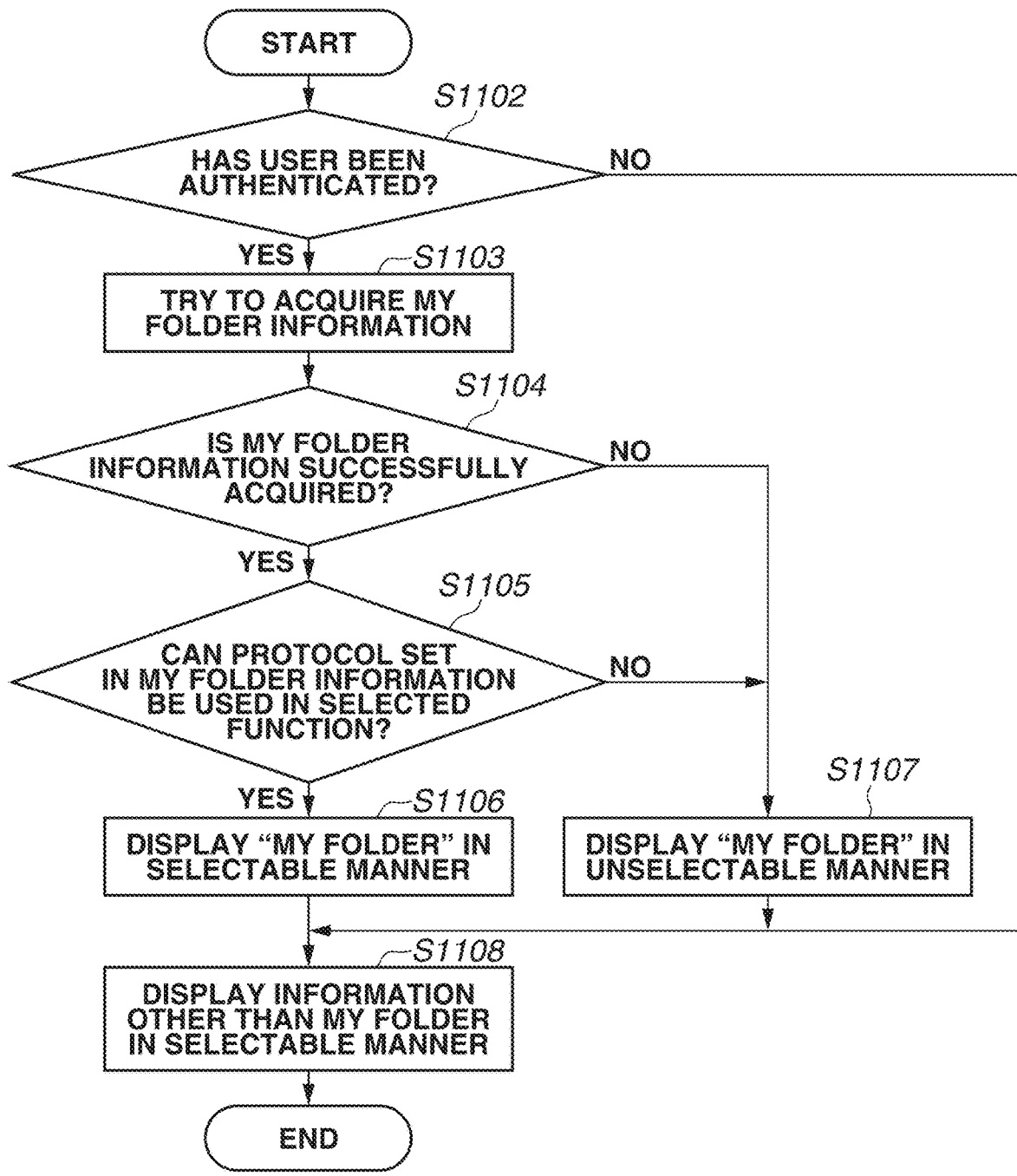
FIG. 8 is a flowchart for explaining processing to be performed when the user uses My Folder.

In the case where the processes of step S1106 and step S1108 in FIG. 8 are performed, the UI control unit 201 provides a display screen as described above and illustrated in FIG. 5B. In this case, a plurality of folders corresponding to the My Folder information and the information on the shared folder in the file sharing server 302 already registered is displayed as options for the saving destination in the "Scan and Save" function.

Figure 9:
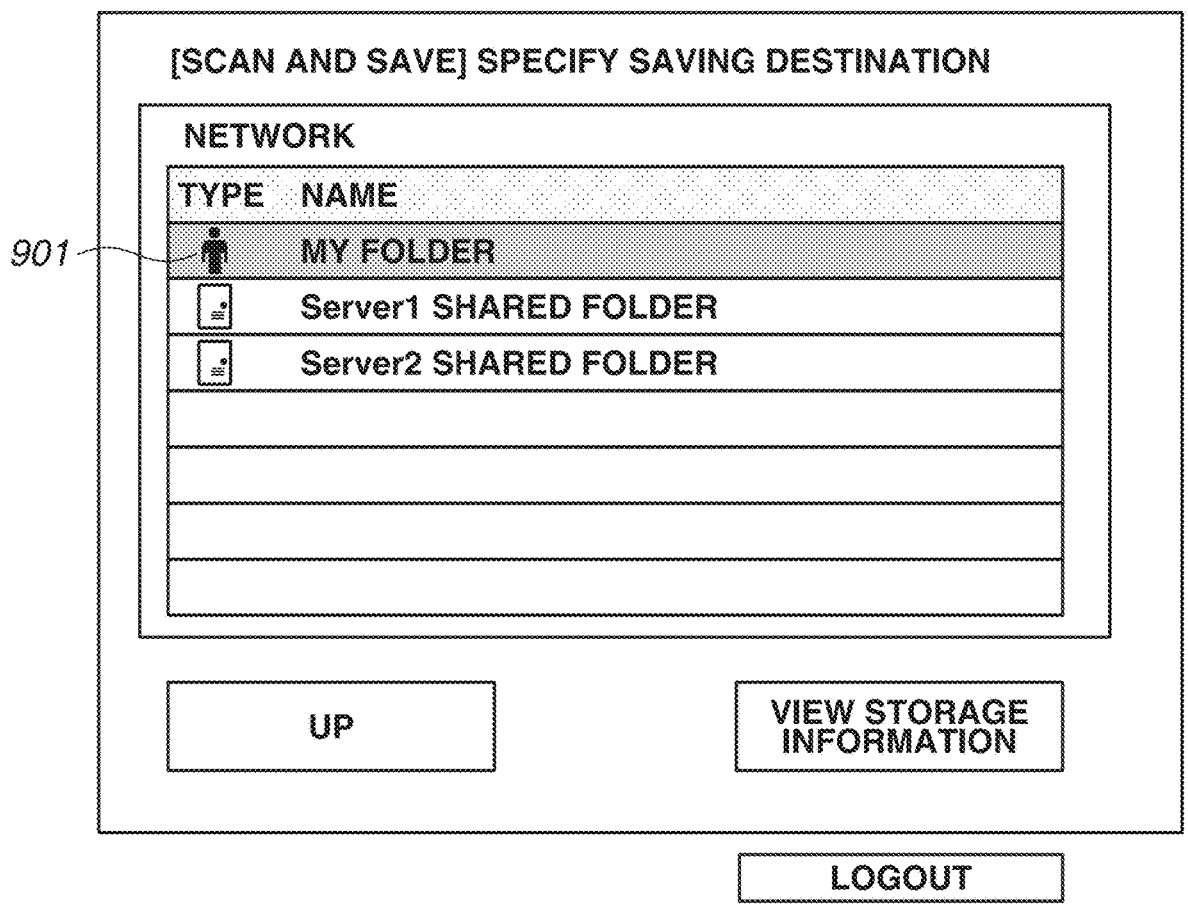
FIG. 9 illustrates an example of an operation screen of the "Scan and Save" function to be provided when use of My Folder is restricted.

In the case where the processes of step S1107 and step S1108 in FIG. 8 are performed, the UI control unit 201 provides a display screen as illustrated in FIG. 9. In FIG. 9, display control different only in a part 901 from the screen illustrated in FIG. 5B is performed. As described above, since FTP is set as the protocol in the My Folder information in the screen of FIG. 9, "My Folder" is not selectable as a saving destination of a file including data obtained by scanning. In this case, only a plurality of folders corresponding to information on the shared folders in the file sharing server 302 already registered is displayed as options for the saving destination in the "Scan and Save" function, and the folder corresponding to the My Folder information is excluded from the options.

In FIG. 8, in the case where the application determines that the user has not been authenticated (NO) in step S1102 and the process of step S1108 is performed, the above-described display screen, as illustrated in FIG. 5B, including the list 507 in which the "My Folder" is not displayed is provided. This is because the user is not an authenticated user, and thus acquisition of the My Folder information is not attempted.

In FIG. 8, even if the application determines that the My Folder information is not successfully acquired (NO) in step S1104, the process of step S1107 may be skipped, and the process of step S1108 may be performed.

With the above-described exemplary embodiment, when scanned image data is stored, it is possible to provide a mechanism allowing for appropriately selecting a saving destination identified based on a folder path registered in advance for a user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-007942, filed Jan. 21, 2019, which is hereby incorporated by reference herein in its entirety.

What is claimed is:

1. An image processing apparatus including a storage device configured to manage folder information including path information and a type of protocol in association with user information on a user of the image processing apparatus, and providing a first function and a second function for handling image data obtained by scanning, the image processing apparatus comprising:
at least one memory storing instructions; and
at least one processor executing the instructions causing the image processing apparatus to:
acquire folder information associated with user information on an authenticated user; and
determine whether a protocol included in the acquired folder information is available when the first function is to be used,
wherein, in a case where it is determined that the protocol included in the acquired folder information is available, a folder corresponding to the acquired folder information is displayed in a selectable manner on a screen for selecting a saving destination for storing the image data as a file by using the first function,
wherein, in a case where it is determined that the protocol included in the acquired folder information is unavailable, a folder corresponding to the acquired folder information is displayed in an unselectable manner on the screen for selecting the saving destination by using the first function, and
wherein, when the second function is to be used, a folder corresponding to the folder information including the type of the protocol determined to be unavailable is available as a saving destination for storing the image data as a file by using the second function.

2. The image processing apparatus according to claim 1, wherein information on a shared folder in a file server that is registered without being associated with user information is registered in the storage device as a candidate for the saving destination,
wherein, in a case where it is determined that the protocol included in the acquired folder information is available, a plurality of folders corresponding to the acquired folder information and the information on the shared folder is displayed on the screen for selecting the saving destination so that the saving destination is selectable from the plurality of folders, and
wherein, in a case Where it is determined that the protocol included in the acquired folder information is unavailable, folders corresponding to the information on the shared folder are displayed on the screen for selecting the saving destination so that the saving destination is selectable from the folders.

3. The image processing apparatus according to claim 1, wherein a folder corresponding to the folder information associated with the user information is not displayed on the screen for selecting the saving destination in a case where the user is not authenticated.

4. The image processing apparatus according to claim 1, wherein in a case where a predetermined protocol is set as the folder information associated with the user information when the folder information is registered in association with the user information in the storage device, it is displayed that the folder information is unavailable for the first function provided by the image processing apparatus.

5. The image processing apparatus according to claim 4, wherein the predetermined protocol is File Transfer Protocol (FTP).

6. A method for an image processing apparatus including a storage device configured to manage folder information including path information and a type of protocol in association with user information on a user of the image processing apparatus, and providing a first function and a second function for handling image data obtained by scanning, the method comprising:
acquiring folder information associated with user information on an authenticated user; and
determining whether a protocol included in the acquired folder information is available when the first function is to be used,
wherein, in a case where it is determined that the protocol included in the acquired folder information is available, a folder corresponding to the acquired folder information is displayed in a selectable manner on a screen for selecting a saving destination for storing the image data as a file by using the first function,
wherein, in a case where it is determined that the protocol included in the acquired folder information is unavailable, a folder corresponding to the acquired folder information is displayed in an unselectable manner on the screen for selecting the saving destination by using the first function, and
wherein, when the second function is to be used, a folder corresponding to the folder information including the type of the protocol determined to be unavailable is available as a saving destination for storing the image data as a file by using the second function.

* * * * *